United States Patent [19]

Gurney

[11] 4,088,633

[45] May 9, 1978

[54] METHOD OF MARKING PAVED SURFACES AND CURABLE TWO-PART EPOXY SYSTEMS THEREFOR

[75] Inventor: Richard S. Gurney, Roseville, Minn.

[73] Assignee: H. B. Fuller Company, St. Paul, Minn.

[21] Appl. No.: 635,694

[22] Filed: Nov. 26, 1975

[51] Int. Cl.² .................. C08G 59/56; C08L 63/02
[52] U.S. Cl. .................. 260/47 EN; 260/2 N; 260/2 EC; 260/47 EC; 260/830 TW
[58] Field of Search ............ 260/47 EN, 47 EC, 2 N, 260/2 EC, 830 TW

[56] References Cited

U.S. PATENT DOCUMENTS

| | | | |
|---|---|---|---|
| 2,783,214 | 2/1957 | Homan | 260/28 |
| 2,866,768 | 12/1958 | Bolstad | 260/37 |
| 3,303,165 | 2/1967 | Wallis et al. | 260/47 |
| 3,327,016 | 6/1967 | Lee | 260/830 |
| 3,428,601 | 2/1969 | Dijkstra et al. | 260/47 |
| 3,629,181 | 12/1971 | Heer et al. | 260/31.8 E |
| 3,853,812 | 12/1974 | Helm | 260/47 EC |
| 3,943,104 | 3/1976 | Waddill | 260/47 EN |

FOREIGN PATENT DOCUMENTS 1,258,454   12/1971   United Kingdom.

OTHER PUBLICATIONS

Lee & Neville, "Handbook of Epoxy Resins," p. 22-18, McGraw-Hill, 1967.

Primary Examiner—Harold D. Anderson
Assistant Examiner—E. A. Nielsen
Attorney, Agent, or Firm—Merchant, Gould, Smith, Edell, Welter & Schmidt

[57] ABSTRACT

The disclosed coating system comprises a curable liquid epoxide and an amine hardener or co-curative. The amine co-curative comprises a blend of an aliphatic amine (e.g. trimethyl hexamethylene diamine) and a cycloaliphatic amine (e.g. cyclohexane-bis[methylamine]). This coating system, when suitably combined with a reflectorizing material, has the ability to satisfy some or all of the very troublesome requirements of a highway marking or striping composition and is therefore useful in methods for marking or striping paved surfaces.

5 Claims, No Drawings

METHOD OF MARKING PAVED SURFACES AND CURABLE TWO-PART EPOXY SYSTEMS THEREFOR

FIELD OF THE INVENTION

This invention relates to the application of a road-marking or pavement-marking material to a paved surface for insitu cure. An aspect of this invention relates to a highway marking or striping material to which the conventional reflective materials can be added, e.g. the types of glass beads used in the formulation of reflectorized paint. Still another aspect of this invention relates to a 100% solids, two-part epoxy coating composition in which part A comprises a curable liquid epoxide and part B comprises a liquid polyfunctional amine hardener (sometimes referred to as an amine co-reactant or co-curative). Still another aspect of this invention relates to a unique polyfunctional amine hardener composition for the two-part coating composition.

DESCRIPTION OF THE PRIOR ART

The use of epoxy resins in reflective markers, curable road-marking materials, traffic paint compositions, highway marking compositions or paints, and the like is very attractive for a variety of technical reasons, including durability and wear resistance. Many other types of marking compositions or highway paints have been both thoroughly investigated and widely used but can be extremely limited in their scope of application and effectiveness. For example, modified chlorinated rubber-type coatings are difficult to apply to damp roadway surfaces, and may also be difficult to apply when ambient temperatures are below 10° C. Furthermore, once the chlorinated rubber coating is in place, re-coating may be required as soon as three or four months after application.

Several approaches have been suggested for utilizing epoxy resin technology in the field of highway paints and highway marking compositions. These various approaches have been designed to solve one or more of the extremely taxing problems which confront the epoxy chemist in this particular field. Indeed, the epoxy chemist is obliged to manipulate several (or even most) of the variables inherent in the known and theoretically possible 1- and 2-part epoxy coating systems in order to deal with the complex set of problems imposed by the traffic marking art. The following list sets forth some of the requirements of a street or highway marking composition:

Adhesion to siliceous or asphaltic road surfaces.

Resistance to chemical attack by water and/or de-icing salts.

Abrasion resistance with respect to rubber-tired vehicles, sanding, snowplowing, etc.

Minimal solvent hazards during application of the coating, if possible.

Ability to adhere to or hold or retain a glass bead filler or glass bead overcoating, which filler or overcoating provides the required reflectorization.

Long-term weather resistance.

Ability to be applied under a wide variety of ambient temperature and road surface conditions, and the ability to become tack-free within a short time under any of these conditions.

Flowability or sprayability, e.g. adaptability for use with airless spray equipment.

Good wetting action with respect to the roadway surface.

Flexibility (i.e. ability to move as road surfaces expand, contract, etc.).

If possible, the ability to be applied without previous priming of the roadway surface.

Without careful selection of raw materials and extensive manipulation of the variables discussed previously, epoxy resin technology is not necessarily ideal for meeting all these requirements. For example, some epoxy coating systems are very slow to cure, particularly at temperatures below 20° C. Other epoxy systems may actually cure too fast in the summertime when the roadway surface has been heated up well beyond the ambient temperature. (For example, road surface temperatures in excess of 50° C. and approaching 65° C. can occur in hot summer weather, due to the heat-absorbtive characteristics of dark-colored asphaltic pavements.) Some epoxy coating systems require primers; others, due to the high viscosity of the epoxy prepolymer, require the use of volatile solvents. Still other epoxy systems can be too rigid after cure, insufficiently resistant to abrasion, or the like.

The following references are believed to illustrate some of the ways in which the traffic paint or highway marking art has dealt with the inherent short-comings of epoxy coating compositions:

| U.S. Patent No. | Patentee | Issue Date |
|---|---|---|
| 2,897,733 | Shuger | August 4, 1959 |
| 3,046,851 | de Vries | July 31, 1962 |
| 3,418,896 | Rideout | Decemeber 31, 1968 |
| 3,446,762 | Lopez et al | May 27, 1969 |
| 3,787,349 | Eliasson | January 22, 1974 |

The epoxy resin art is, of course, much broader than this particular field of coating compositions, and it would be difficult to provide even a representative sampling of the whole field of epoxy technology, particularly in view of the enormous utility of these materials (e.g. as adhesives, castings, potting compounds, etc.). Needless to say, a wide variety of amine hardening agents has been used with an equally wide variety of curable epoxide monomers, prepolymers, etc. The following list of references is believed to be representative of the type of epoxy technology relevant to the particular compositions selected for use in this invention:

| | |
|---|---|
| 2,783,214 - Homan | 3,718,617 - Royal |
| 2,794,754 - Schroeder | 3,728,302 - Helm |
| 2,943,953 - Daniel | 3,732,309 - Garnish |
| 3,102,823 - Manasia et al | 3,734,887 - Schmitt |
| 3,468,830 - Kiss | 3,734,965 - Becker |
| 3,532,653 - Smeal | 3,751,471 - Becker |
| 3,538,184 - Heer | 3,773,703 - Smeal |
| 3,558,558 - Porret | 3,784,583 - Smith |
| 3,609,121 - Lohse | 3,787,405 - Porret |
| Chem. Abs. 72:3269k (1970), an abstract of German laid-open application 1,912,485 of November 20, 1969 | 3,787,520 - Lobana |
| | 3,793,247 - Fleming |
| | 3,631,150 - Green |
| | 3,658,728 - Hoffman et al |

SUMMARY OF THE INVENTION

It has now been found that an outstanding method for marking a paved surface is within the scope of the capabilities (as well as the inherent limitations) of epoxy resin technology, provided that a combination of cycloaliphatic and aliphatic polyfunctional amines is used as the amine hardener (i.e. the co-curative or co-reactant for the liquid vicinal epoxide composition). This combination of amines appears to provide a set of properties during application, and after cure, which is particularly well suited to the road surface marking art. The combination also provides properties that apparently cannot be achieved with either type of amine co-curative used alone. Although this invention is not bound by any theory, it is believed that the aliphatic type of amine co-curative, particularly the branched aliphatic variety contributes flexibility, while the cycloaliphatic type of polyfunctional amine provides rapid thin film cure. The resulting cured thin film appears to have the advantages of a cured thermoset material, including weather resistance, wear resistance, and resistance to chemical attack, without some of the disadvantages, e.g. excessive rigidity. Furthermore, through various selections of materials included in a two-part formulation of this invention, the possible disadvantages inherent in the sensitivity of vicinal epoxide groups toward moisture are substantially reduced or avoided. Through additional manipulation according to the teachings of this invention, cure rates can be adjusted and controlled to meet various conditions, e.g. pavement temperatures in excess of 50° C. and adverse ambient weather conditions, including rain and temperatures down to 0° C.

Thus, the method of this invention involves:

(a) supplying to the point of application the aforementioned blended co-curative agent;

(b) supplying to the point of application a suitable curable liquid vicinal epoxide composition, the proportioning of the epoxide composition and co-curative being controlled so as to provide a ratio of 3 epoxide equivalents to active hydrogen-bearing amine equivalents ranging from about 1:1 to about 1.5:1;

(c) applying the co-curative and the liquid epoxide to the paved surface (preferably after intimately mixing the co-curative and the liquid epoxide); and (d) permitting the resulting mixture to cure in situ on the paved surface. It is ordinarily preferable to maintain the liquid epoxide and the co-curative in a moderately heated state prior to application (e.g. heated to a temperature ranging from about 40° to about 90° C.); however, once the epoxy and the curative have been blended and applied to the road surface (e.g. with airless spray equipment), rapid cures will ensue without any further application of heat and despite the lack of any special preparation of the asphaltic or siliceous road surface, even in moderately cold weather. For example, a highway stripe or lane-marking applied according to the teachings of this invention can be substantially tack-free and ready to accept automobile traffic in less than an hour after application under ambient temperature conditions ranging from 0° to 40° C. or more.

Using the typical part A-part B terminology, a part A of this invention typically comprises a 100% solids polyglycidyl ether of a polyhydric phenol. The typical part B comprises the aliphatic polyamine and the cycloaliphatic polyamine, blended in a weight ratio ranging from 10:90 to 90:10, a portion of this polyamine combination having been converted to an amine-epoxy adduct, the epoxy portion of this adduct being contributed by a diglycidyl ether of a dihydric phenol. It is preferred that part B also contain a monohydric phenol and a tertiary alkanolamine. The preferred polyglycidyl ether for use in part A is derived from methylol-substituted bisphenol A and an epihalohydrin. Any diluents included in the composition are preferably reactive, so that the composition still remains substantially in the 100% solids category. For improved adhesion to road surfaces, silane adhesion promoters can be included in the epoxy coating composition, e.g. in part A.

DETAILED DESCRIPTION

The basic theory of epoxide chemistry is reasonably well understood, although an exact theoretical explanation for the variety of reactions which occur during curing is not always possible. In theory, the vicinal or 1, 2-epoxide ring (also called the oxirane ring) can be opened by interaction with a compound having an available unbonded pair of electrons. Once the ring is opened, the door is open to further reactions with active hydrogen bearing substituents. The term "active hydrogen", in this context, refers to hydrogen atoms which are active according to the Zerewitinoff test, J. Amer. Chem. Soc. 49, 3181 (1927). When the electron pair-containing compound is an active hydrogen-bearing amine (i.e. a primary or secondary amine), both the electron pair on the nitrogen and the active hydrogen can participate in the reaction. There is no perfect term for describing the function of a primary or secondary amine in this context, it is variously referred to as a "hardener", a "co-curative", or a "co-reactant" for the epoxide. In any event, the net result is a joining of the amine molecule and the epoxide-containing molecule, resulting in an increase in molecular weight and, most typically, cross-linking between epoxide-containing molecules to yield a thermoset resin.

The curable epoxide is also referred to in various ways. Sometimes it is called the epoxy "resin". This may be a somewhat misleading way to refer to a monomer or prepolymer capable of being cross-linked or hardened or cured to a tough, resinous solid, particularly since the "resin" may be a low molecular weight liquid. Accordingly, the curable liquid vicinal epoxide is referred to hereinafter as the "monomer", it being understood that the "monomer" can be in a very low stage of polymerization, whereby it can contain a few repeating units.

In the preferred practice of this invention, a part A and a part B are maintained at a moderately elevated temperature, e.g. 40°–90° C., more preferably about 60°–65° C., using heated storage zones or heated supply lines or the like. The two heated components can then be pumped and automatically blended in airless spray equipment prior to application of the coating onto a highway surface. Preferred application rates provide a thin film or layer or coating on the pavement substrate, which coating has a thickness generally ranging from about 1 to 100 mils (0.025–2.5 mm), more preferably 10–25 mils. This coating thickness corresponds to a spreading rate of approximately 20–1000 square feet per gallon, more preferably 50–200 square feet per gallon. Equipment is commercially available for proportioning, heat-recirculating and/or mixing of the two-component system. The two parts are mixed and/or supplied to the spray head in the proper proportion, using this equipment, and the proportioning can be done automatically. For example, the ratio of part B to part A, by volume, can range from 20 to 200 parts per 100, based on the volume of part A, more preferably the volume ratio of part B:part A ranges from about 1:1.5 to 1:2.5 (1.5:1 to 2.5:1 in terms of A:B). It is particularly desirable that there be a slight excess over stoichiometry in the ratio of free epoxide equivalents to active hydrogen-bearing amine equivalents. For most purposes, a 1–10% excess can be sufficient.

In the event that deposits or the like form in the supplying or circulating line of the storing, mixing, and spraying equipment, these deposits can be cleaned out by solvent flushing or cleaning, e.g. cleaning of the mixing manifolds, hoses, and nozzles. Ordinarily, it is preferred to avoid the use of essentially volatile organic solvents in parts A and B themselves, however.

Stated another way, the part A and part B are preferably substantially 100% solids compositions. The term "solids" in this context is borrowed from paint chemistry, wherein "solids" includes any components (be they liquid or solid) which become a part of the ultimately obtained solid coating. That is, the term "solids" excludes essentially volatile solvents or carriers. (By "essentially volatile" is meant a liquid which has a boiling point or initial boiling point below 150° C. at normal atmospheric pressure.)

In the preferred method of application, glass reflective beads are applied to the fresh coating of material on the paved substrate, while the coating is still in a relatively early stage of cure. In this manner, the glass beads tend to concentrate near the surface of the coating, where they are most needed for retroreflection. Despite the concentration near the surface, however, the glass beads are firmly held in place and adhere strongly to the epoxy coating. This occurs because the beads are wet out fairly thoroughly on their surfaces and partially penetrate into the thin layer of epoxy material.

The preferred method of applying the glass beads is to provide a glass bead dispenser immediately "behind" the airless spray nozzle, i.e. very slightly downstream from the nozzle. Thus, epoxy coating which has been applied to the pavement and has been in place for only a fraction of a second is then overcoated with the flow of beads. The beads can be applied to the epoxy coating at any suitable rate, e.g. 0.005-0.1 pounds per square foot, more preferably 0.003-0.06 lb/ft².

As noted previously, the most efficient cures are obtained if the part A and part B are intimately blended prior to application to the paved surface. After parts A and B are blended, the resulting mixture has a short, but workable pot life. Ordinarily, a pot life in excess of five or ten seconds is all that is required for sprayability or flowability of the mixture. An excessive pot life can be undesirable, since this may result in undue traffic delays and rerouting of traffice while the cure is taking place on the road surface. It is particularly desirable that the cure be sufficiently advanced to provide a tack-free coating within one hour, more preferably within 40 minutes. In actual practice, tack-free times as short as 5-10 minutes can be obtained at 20°-25° C. ambient temperature.

Strong adhesion to the road surface is desired, and a silane adhesion promoter is included in the composition (e.g. in part A) for this purpose. It has been found that the omega-amino aliphatic trialkoxy silanes are effective in improving adhesion to both siliceous (e.g. portland cement) surfaces and the typical asphalt surfaces, since most asphalt surfacing materials contain an aggregate which reacts with the SiOH group.

The following is a description in detail of each of the major parts of a coating system of this invention.

Part A: the Curable Liquid Epoxide

This composition contemplates the use of two different types of part A systems, although both systems have several things in common. Both systems contain a polyglycidyl ether of a polyhydric alcohol and, when opacity is desired, either type of part A can contain a pigment. The primary difference between the two types of part A systems is in the desired cure rate, and, hereinafter, the preferred part a system will be referred to as the "fast cure" part A.

The key ingredient of the "fast cure" part A is preferably a diglydicyl ether of a methylol-substituted bishpenol A. As is known in the art, the typical diglycidyl ethers can be represented by the formula:

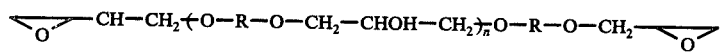

wherein R represents a divalent residue of a dihydric alcohol, e.g. a dihydric mono or polynuclear phenol; and $n$ is a number ranging from 0 to 7.

Wherein $n$ is a number ranging from 0 to 7, and R represents the residue of the dihydric phenol, e.g. the bisphenol A. ("bisphenol A" is a common or trivial name for bis-(4-hydroxyphenol)-2,2-propane). Since mixtures of molecules wherein the value for $n$ is different commonly occur in commercially available materials, the 0-7 range for $n$ can be considered to include fractional numbers. In the preferred embodiments of this invention, $n$ will ordinarily be 0 or very close to 0, so that epoxy equivalent weights will generally range from about 150 to 1,000, more preferably less than 300.

In the methylol-substituted diglycidyl ethers of bisphenol A, the methylol groups are substituted directly onto the aromatic rings of the bisphenol A nucleus and are usually present in free or unreacted form in the epoxide monomer composition. These methylol groups are believed to exert an inductive effect upon the diglycidyl ether, which effect increases the reactivity of the epoxide rings. A particularly strong increase in reactivity can be obtained with the 3,3'- (i.e. $m,m'$) dimethylolated bisphenol A, which is a symmetric molecule, both methylol substituents being substituted meta to the quaternary carbon substituent of the two benzene rings. Dimethylolated bisphenol A-type diglycidyl ethers are available from M and T Chemicals, Inc., under the trade designation "APOGEN". The "APOGEN" products range from 195 to 225 in epoxide equivalent weight and from 6,000 to 30,000 centipoise (cps) in viscosity, the preferred epoxide equivalent weight range being 205-225 and the preferred viscosity range being 6,000-9,000 cps at 50° C., ("APOGEN" 104, trade designation of M and T Chemicals, Inc.). So long as pavement temperatures are below about 50° C., the "fast cure" part A system can be used. However, for higher pavement temperatures, it is preferred to include some "slow cure" part A, the slower curing material being a composition containing a low molecular weight diglycidyl ether of bisphenol A; that is, a conventional bisphenol A-type epoxy monomer which does not contain substituents on the benzene rings capable of increasing the reactivity of the epoxide rings. In the "slow cure" part A, the preferred diglycidyl ethers of bisphenol A have an $n$ value (see the foregoing formula) which is also very close to 0, so that the epoxide equivalent weight is in the 150-300 range, e.g. 180-200. Such epoxide monomers are available from several different suppliers under trade designations such as "EPON" (trademark), "DER" (trademark), etc.

Both the "fast cure" and "slow cure" part A compositions can contain several other ingredients which will be described in detail subsequently.

The following table illustrates the amounts of "slow cure" part A and "fast cure" part A preferred for use under various roadway temperature conditions.

| Roadway Surface Temperature | Amount of "Fast Cure" Part A, Volume % | Amount of "Slow Cure" Part A, Volume % |
| --- | --- | --- |
| 35-45° F. (2-7.5° C.) | 100% | 0% |
| 45-120° F. (7.5-49° C.) | 80-100% | 0-20% (preferably >10%) |
| 120-140° F. (49-60° C.) | 50-75% | 25-50% |
| Over 140° F. (Over 60° C.) | 50% | 50% |

Both the "fast cure" and the "slow cure" part A can comtain a reactive diluent for reducing viscosity. The preferred reactive diluents are glycidyl ethers of aliphatic mono-ols or polyols, i.e. aliphatic monohydric or polyhydric alcohols. Among such aliphatic alcohols are the $C_4$–$C_{12}$ aliphatic chains on which one or more hydroxyls are substituted. It is preferred that the epoxide functionality of the resulting glycidyl ethers ranges from about 1 to about 4, more preferably 1-3. Given the relatively lower molecular weight of the aliphatic chain, epoxide equivalent weights can be well under 300, e.g. 100 to about 385, preferably less than 240.

The selection of the epoxide functionality will depend upon the desired overall average functionality for the part A system and the desired amount of excess over stoichiometry for epoxide in the combined part A/part B coating system. Thus, for example, a small amount of aliphatic triglycidyl ether can compensate for a slight excess of active hydrogen equivalents in the part B component. A particularly useful type of triglycidyl ether is based on trimethylol alkanes (e.g. trimethylol ethane), has an epoxide functionality of about 2.9 and an epoxide equivalent weight (EEW) within the range of about 150 to about 170. Commercial versions of these polyglycidyl ethers are available from Celanese Corporation under the trademark "Epi-Rez", e.g. "Epi-Rez" 5044. This triglycidyl ether is very effective in lowering the overall viscosity of a part A system, due to its relatively low viscosity as compared to diglycidyl ethers of the bisphenol A type. For example, the viscosity can be within the range of about 150 to less than 1,000 (e.g. about 350) centipoise, determined at 77° F., (25° C.).

The low molecular weight and low equivalent weight preferred aliphatic monoglycidyl and polyglycidyl ethers are fully compatible with the diglycidyl ethers of bisphenol A and are therefore capable of reducing the viscosity of the curable liquid epoxide without significantly altering phase relationships. Due to the substantially negligible vapor pressure of these aliphatic glycidyl ethers, they can serve as diluents without creating solvent hazards. To illustrate, the flash point of "Epi-Rez" 5044 is approximately 320° F. (160° C.) — a relatively safe flash point. At the same time, these low equivalent weight glycidyl ethers do not alter the "100% solids" characteristics of the system, since they react with the active hydrogen in part B.

The aliphatic triglycidyl ethers with an equivalent weight less than 180 are particularly useful in "fast cure"-type part A systems. A part A system can comprise 5-50% of the low viscosity glycidyl ether, more preferably 10-30% by weight. Optimum results are obtained with about 20-25% by weight. The amount of methylolsubstituted diglycidyl ether of bisphenol A should be larger than the amount of low viscosity aliphatic glycidyl ether, such that on a part per hundred basis (methylol-substituted diglycidyl ether of bisphenol A equals 100 parts by weight), the amount of the low viscosity aliphatic glycidyl ether will ordinarily range from about 25 to about 75 parts per hundred (phr), more preferably 30-60 phr. Smaller amounts of the low viscosity aliphatic glycidyl ether can be used when the amount of pigment is minimized, larger amounts are needed when the amount of pigment is maximized. The nature of the pigment and other fillers can also affect the high viscosity/low viscosity glycidyl ether ratio, e.g. thixotropic fillers and/or pigments can necessitate larger amounts of the low viscosity monomer.

As will be apparent from the foregoing discussion, the amount of pigment used in either a "fast cure" or "slow cure" part A of this system varies depending upon the nature of the pigment, the desired viscosity, and the like. Pigments with good opacity, such as titanium dioxide can be used in modest amounts (e.g. less than 30% by weight of the total part A system) with good results, the preferred range being 15-25% by weight, depending upon the amount of coloration which is desired. Other pigments known in the art of pigmented 2-part resin systems include the silicates (including clays), the carbonates (e.g. the various forms of calcium carbonate), the sulfates (e.g. barium sulfate), various forms of silica, and various metal oxides (which are often used in small amounts to add color to the white opacifying pigments). Pigment particle sizes are generally −200 or even −325 U.S. mesh.

In the case of the "fast cure" part A system, a simple titanium dioxide pigment component will ordinarily suffice. In a "slow cure" part A system, however, it is ordinarily preferred to include a more complex pigment-filler-thickener component, e.g. a mixture of titanium dioxide, a fumed or colloidal silica thixotrope, and a small amount of asbestos fiber. The total pigment-filler-thickener component will generally fall into about the same range of concentration as the pigment component of the "fast cure" part A, i.e. less than about 30% by weight but generally more than about 15% by weight. Based on the total "slow cure" part A system, small amounts of fumed silica (sometimes called pyrogenic silica) and asbestos fiber are effective, e.g. less than 5% by weight. Stated another way, at least about 70% by weight of the total pigment-filler-thickener component will ordinarily be the pigment portion.

In the "slow cure" system, the viscosity-lowering glycidyl ether (which also helps the wetting characteristics of the system) can be a relatively lower viscosity, relatively lower functionality, relatively higher EEW material as compared to the preferred aliphatic triglycidyl ethers of the "fast cure" part A systems. Aliphatic groups in these glycidyl ethers can range all the way from $C_8$ to $C_{18}$ in carbon content.

There is a class of aliphatic glycidyl ethers with varying chain length alkyl groups which can be very low in viscosity, e.g. as low as 5-100 centipoise at 25° C.; epoxide functionality of these compounds is relatively low, so that the EEW will tend to range from 200 to about 385, more preferably about 225-240. Despite the very low viscosity, flash points are reasonably safe (e.g. above 100° C.) and volatility is extremely low. At 100 mm Hg, initial boiling points tend to be above 100° C.

Oxirane oxygen content in weight percent can range from about 4 to more than 7%. As in the case of the "Epi-Rez" glycidyl ethers, these extremely low viscosity glycidyl ethers are compatible with diglycidyl ethers of bisphenol A. Due to their lower viscosity, however, they can be used in smaller proportions, e.g. 10-30 phr, more typically 15-25 phr, based upon the weight of the diglycidyl ether of bisphenol A in the "slow cure" part A composition.

A commercially available version of these extremely low viscosity aliphatic glycidyl ethers is the family of epoxides commercially designated P & G epoxides #7, #8, and #45. The preferred P & G epoxide is #7, with an EEW ranging up to about 235 and averaging near 230.

As noted previously regarding the triglycidyl ethers of the "fast cure" part A, the low viscosity aliphatic glycidyl ethers are reactive diluents and do not significantly alter the "100% solids" characteristics of the part A system. Of course, to preserve the epoxide functionality of either type of Part A system, it is generally preferred to avoid strongly acidic fillers, pigments, and the like, pigments and fillers within the pH range of about 6 to about 10 being preferred.

In the "slow cure" part A system, it is generally preferred to include an additional reactive diluent which can be reactive by virtue of the presence of active hydrogen rather than epoxide substituents. A compound particularly preferred for this purpose is dinonyl phenol, which can be mixed with up to about 20 or 25% mononoyl phenol. Dinonyl phenol is a monohydric, di-alkylsubstituted phenol with good solvent properties and relatively low volatility and relatively high flash point. Its boiling range tends to be above 300° C. and the flash point (clear open cup method) is above 170° C. Again, due to the presence of the phenolic active hydrogen, this solvent does not significantly alter the "100% solids" characteristics of the coating system. Minor amounts of monohydric alkyl-substituted phenol are sufficient for viscosity control, e.g. less than 10 or 15% of the part A system. It is preferred that such monohydric phenolic material be substituted with at least 1 higher alkyl substituent, i.e. a straight or branched chain alkyl group having at least 7 carbon atoms.

For good adhesion to both asphaltic and siliceous pavement surfaces, it is preferred to include a silane adhesion promoter in any part A composition, be it of the "slow cure" or "fast cure" type. The preferred adhesion promoters contain active hydrogen, e.g. by virtue of the presence of an active hydrogen-bearing amine substituent, which can be either primary of secondary. The adhesion promoting functional group of the compound is typically a trialkoxy silane capable of hydrolyzing to —Si(OH)$_3$. To minimize stearic hindrance for the primary or secondary amino group, it is preferred that this group be in the omega position of an aliphatic chain, e.g. gamma-propyl, beta-ethyl, etc.

For convenience of use in the part A system, it is preferred to form an amine-epoxide adduct from the adhesion promoter, i.e. the reaction product of the omega-aminoalkyl trialkoxy silane and a glycidyl ether, preferably a polyglycidyl ether. Among the suitable adducts of this type are beta-3,4 (epoxycyclohexyl) ethyltrinethoxysilane and gamma-glycidoxypropyl-trimethoxysilane. Of these, the latter is preferred. Both are available from Union Carbide Corporation under the trade designations "A-186" and "A-187", respectively. Since hydrolysis of these compounds produces a lower alkanol, it is preferred, for the sake of efficiency of adhesion promotion, that this alkanol be methanol or ethanol. Accordingly, trimethoxy and triethoxy silanes are particularly preferred. In any event, the commercially available adhesion promoters are sufficiently efficient to permit use in very small quantities, e.g. less than 5% by weight of the total part A system, more typically 0.1-2% by weight.

The preferred part A systems are summed up in the following table:

| Component | "Fast Cure" Part A Amt. in wt-% or phr | "Slow Cure" Part A Amt. in wt-% or phr |
|---|---|---|
| Diglycidyl ether of bisphenol A | Optional, preferably less than 35 wt-% | 50-70 wt-% |
| Diglycidyl ether of bisphenol A, methylol-substituted | 50-70 wt-% | Optional, preferably less than 35 wt-% |
| Low viscosity, low functionality C$_6$ aliphatic glycidyl ether (reactive diluent) | Optional | by weight: 10-50 phr, based on diglycidyl ether = 100 |
| Low viscosity, high functionality (>2), glycidyl ether (reactive diluent) | by weight: 25-75 phr, based on diglycidyl ether = 100 | Optional |
| Pigment-filler (e.g. fibrous filler) - thixotrope component | 15-30 wt-%, fibrous fillers and thixotropes optional | 15-30 wt-% |
| Higher alkyl-substituted monohydric phenol | Optional | 0.5-wt-% |
| Adhesion promoter | 0.1-5 wt-% | 0.1-5 wt-% |
| Volatile, non-reactive solvent | Optional, preferably less than 5 wt-% | Optional, preferably less than 5 wt-% |

As will be apparent from the foregoing table, these two part A systems are compatible and can be premixed in any desired ratio from 100:0 up to about 25:75. Alternatively, part A systems intermediate in properties between the "fast cure" and the "slow cure" systems can be directly formulated, using various mixtures of diglycidyl ethers of varying cure rates. Volatile, nonreactive solvents should be kept to a minimum, so that the part A system has a substantially "100% solids" capability, e.g. at least 90% solids.

The Part B System

The following description relates to a part B which can be used with either the "fast cure" or the "slow cure" part A, or any mixture of part A systems. In its essential features, a part B of this invention contains a mixture of aliphatic and cycloaliphatic polyfunctional amines combined with 1 or more reactive diluents (if necessary) and/or tertiary amine initiators and/or reactive epoxides, which epoxides can combine with a portion of the active hydrogen-containing content of the part B system, thereby providing an epoxy-amine or epoxy-hydroxide adduct without eliminating all the active hydrogen in the total part B system. Alternatively, the epoxy-amine or epoxy-hydroxide adduct can be formed or synthesized in advance and simply added to the aliphatic/cycloaliphatic amine combination.

The preferred aliphatic polyfunctional amines are diamino-substituted alkanes, typically branched-chained alkyls, having more than two carbon atoms, e.g. more than six carbon atoms. Among these diamino compounds are the di-primary amines of trimethyl-substituted hexanes, e.g. 2,2,4- or 2,4,4-trimethylhexamethylene diamine. Preferred cycloaliphatic polyamines include 5- and 6-member aliphatic rings upon which one or more active hydrogen-bearing amino groups are substituted, either directly or through lower alkylene bridges, e.g. methylene bridges. A particularly preferred cycloaliphatic nucleus is cyclohexane, upon which can be substituted —NH₂ or —CH₂NH₂. Particularly good results are obtained with symmetrical diamines such as 1,4-bis-(aminomethyl) cyclohexane, although 1,3-bis(aminomethyl) cyclohexane and other asymmetric amine-substituted cycloalkanes are operative. As is known in the art, diamines of hydrogenated aromatic compounds of various types and of isophorone are commercially available. Isophorone diamine is also known as 3-aminomethyl-3,5,5-trimethyl-cyclohexylamine.

Since these preferred diamines are di-primary amines, they can be considered to contain 4 equivalent weights of active hydrogen per mole of compound, even though all 4 equivalents may not have equal reactivity in the context of this invention.

In terms of active hydrogen equivalent weights, the ratio of aliphatic polyfunctional amine to cycloaliphatic polyfunctional amine ranges from 25:75 to 75:25, more typically from 40:60 to 60:40. Since the gram molecular weights of the typical aliphatic and cycloaliphatic amines are not greatly different, weight/weight ratios will be generally within this same range. Even in the event that a pre-reacted epoxy-amine or epoxy-phenol adduct is added to unreacted amines to make up a part B of this invention, it is nevertheless preferred that the part B contain at least about 0.9 equivalents of active hydrogen per 100 grams of part B. (A preferred part A of this invention contains more than 0.35 equivalents of epoxide per 100g.; accordingly, when two parts by volume or about 2.4 parts by weight of part A are combined with part B, stoichiometric requirements will be satisfied. More typically- the part A contains more than 0.4 equivalents per 100 grams, so that 2 parts by volume will provide more than 0.9 equivalents of epoxide. In the part A/part B combination, a slight excess of epoxide over active hydrogen is preferred.)

Thus, the preferred combination of amines can be represented by the following structural formulas:

(a) H₂N—R—NH₂, and
(b) H₂N—R¹—A—R²—NH₂, wherein R represents an aliphatic chain;

R¹ and R² represent divalent lower aliphatic groups; e.g. methylene bridges; and A represents a divalent cycloaliphatic group.

The weight ratio of the amine mixture should be within the range of 10:90 to 90:10, preferably within the weight ratios and equivalents ratios discussed previously. In terms of the total part B composition, each amine will generally be present in the amount of about 5-75% by weight (including the amount necessary to form the aforementioned amine-epoxy adduct), more preferably 5-50% by weight. The balance of the part B will generally consist essentially of reactive diluents (e.g. active hydrogen-containing substantially nonvolatile solvent materials such as the higher alkyl-substituted phenols or other hydroxide-containing materials), tertiary amine initiators, and the epoxide used to form the epoxide-amine adduct. This last-mentioned material will ordinarily be a polyglycidyl ether of a polyhydric phenol.

In the event that the amine-epoxide adduct is preformed and then added to the amine mixture, it is preferred that the molar ratio of total active hydrogen to amine-epoxide adduct in the resulting part B composition be at least 5:1, more preferably 8 to 12:1. The purpose of the amine-epoxide adduct is to reduce the moisture sensitivity of the part B composition and the part A/part B mixture. This helps to permit use of the part A/part B coating system under moist ambient conditions (including wet pavements).

In the following table, a typical part B composition is described. It will be understood that the amounts of epoxide and amine, monohydric phenol, trialkanol amine, etc. are expressed in terms of amounts used to form the amine-epoxy adduct in situ during blending of the total part B system. However, this method of expression should be considered equivalent to the mixture of unreacted active hydrogen-containing components with a pre-formed amine-epoxy adduct. Given the differing reactivities of the various forms of active hydrogen in the composition described below, it is difficult to predict exact ratios between unreacted amine, alkanol, and phenol active hydrogen and the epoxy-amine or epoxy-hydroxide adduct. So long as the ultimately obtained part B composition contains more than about 0.4 equivalents of free primary amine, however, the nature of these reactions and the order of addition of ingredients is not absolutely critical to the operability of this invention.

| Amount by Weight | Equivalent Weights Per 100 Grams of Part B | Component |
|---|---|---|
| 5–50% | 0.4–0.8* | Trimethyl-substituted hexamethylene diamine |
| 5–50% | 0.4–0.8* | bis(aminomethyl) cyclohexane |
| 5–50% | 0.05–.25* | Higher alkyl-substituted phenol |
| 0.5–10% | less than 0.2* | Reactive tertiary amine, preferably triethanolamine |
| 5–30% | less than 0.25 | Diglycidyl ether of bisphenol A, preferably having an EEW of 180–200 |

*Active hydrogen equivalents

Optimum amounts by weight of the above-identified ingredients are: 22–23%; 20–21%; 29–30%; 5–6%; and about 22%, respectively.

The inclusion of triethanolamine in this composition has some beneficial effects which are not fully understood. It is assumed that the tertiary nitrogen can have an initiating effect on the epoxide ring-opening reaction, and it is further assumed that the hydroxide on the alkanol portion of the molecule can contribute active hydrogen. In any event, both the alkyl phenol and the triethanolamine do not significantly alter the 100% solids characteristics of the composition. Like part A, this part B composition has a controlled viscosity and is sprayable.

Reflectorization Filler

It is preferred for traffic marking purposes (particularly highway marking), that compositions of this invention either contain or be combined with a reflective filler such as glass or plastic beads or bubbles. It presently appears that the most effective application of the reflectorizing filler is to treat it as a third part which can be added to the part A/part B coating system, after the coating system has been applied to the paved surface. A less effective manner of including the beads or bubbles is to mix them directly with the part A/part B mixture before application to the substrate. This latter approach is particularly undesirable if the beads or bubbles are easily fractured in a mixing step or if mixing is otherwise made more complicated.

The preferred reflectorizing additive comprises smooth, round, transparent glass spheres (e.g. beads), substantially free of milkiness, film scratch, pits, and air bubbles. The beads preferably have an alkalinity number not greater than 2.0, and it is also preferred that not more than 30% of the beads shall be ovate or imperfect.

When tested for gradation according to ASTM D1214 (by use of U.S. Standard sieves) the following sieve analysis is typically obtained:

|  | Percent (Numerical or by Weight or by Volume) |
| --- | --- |
| −10 + 200 | Substantially 100% |
| +16 | Negligible |
| −20 + 30 | 5–20% |
| −30 + 50 | 30–75% |
| −50 + 80 | 9–32% |
| −80 | 0–10% |

The following example illustrates the principle and practice of this invention without limiting its scope.

EXAMPLE

The following formulations illustrate a "fast cure" part A, a "slow cure" part A, and a part B of this invention. The part B can be used with either the "slow cure" or the "fast cure" part A. When pavement temperatures are below 45° F., the "fast cure" part A is generally used alone. For warmer pavement conditions (pavement temperatures above 45° F.), a portion of the "fast cure" part A can be replaced with "slow cure" material. Under extremely hot pavement conditions, a 50:50 mixture of "fast cure" and "slow cure" can be used as the part A. Otherwise, the "fast cure" material can comprise the major amount of part A.

For optimum stoichiometry (i.e. a slight excess of epoxide over active hydrogen), the ratio of part A to part B is 2:1 by volume.

| "Fast Cure" Part A | |
| --- | --- |
| Percent by Wt. | Ingredient |
| 56.69% | "APOGEN" 104 (Trademark) |
| 22.83% | "EPI-REZ" 5044 (Trademark) |
| 19.69% | "UNITANE" OR-600 (Trademark) |
| 0.79% | "Silane A187" (Trademark) |
| 100.00% | |

| "Slow Cure" Part A | |
| --- | --- |
| Percent by Wt. | Ingredient |
| 58.77% | "DER-331" (Trademark) |
| 12.24% | "P & G Epoxide #7" (Trademark) |
| 3.68% | Dinonylphenol, flashed (Jefferson Chemical Co., Inc.) Wt. % monononylphenol (calculated) 10–20% |
| 0.82% | "Silane A187" (Trademark) |
| 20.40% | "UNITANE" OR-600 (Trademark) |
| 3.13% | "Cab-O-Sil" M-5 (Trademark) |
| 0.96% | "CALIDRIA" RG-144 (Asbestos) |
| 100.00% | |

The materials identified above by trademark have, according to their suppliers, the following chemical compositions:

"APOGEN" 104: m,m′-methylol-substituted diglycidyl ether of bisphenol A (the methylol groups being meta with respect to the quaternary carbon); epoxide equivalent weight (EEW): 205–225; viscosity (cps at 50° C.): 6,000–9,000; density at 25° C.: 1.13–1.16.

"EPI-REZ" 5044: aliphatic triglycidyl ether derived from trimethylolethane and epihalohydrin; average functionality: 2.9; EEW: 150–170; viscosity at 25° C.: 150–350 cps.

"UNITANE" OR-600: alumina-treated rutile titanium dioxide, at least 96% $TiO_2$ (trademark of American Cyanamid Company).

"Silane A187": gamma-glycidoxypropyltrimethoxysilane (trademark of Union Carbide Corporation).

"DER-331": diglycidyl ether of bisphenol A; EEW: 186–192; viscosity: 11,000–14,000 cps.

"P & G Epoxide 7": alkyl glycidyl ether containing predominately n-octyl and n-decyl groups; oxirane oxygen: at least 6.8%, typically 7.0%; density (25° C./25° C.): 0.9; viscosity: 10 cps at 25° C.; EEW: less than 235, typically 229; IBP at 100 mm Hg: 140° C.

"Cab-O-Sil" M-5: fumed silica produced through the flame hydrolysis of $SiCl_4$ at 1100° C.; nominal particle size: 0.012 micron (trademark of Cabot Corporation).

"CALIDRIA" RG-144: chemically treated asbestos fiber, substantially 100% -325 mesh, fiber length less than 0.1 micron (trademark of Union Carbide Corporation).

| Part B | |
| --- | --- |
| Percent by Wt. | Ingredients |
| 22.60% | Trimethyl hexamethylene diamine (Thorson Chemical Company), mixture of 2,2,4- and 2,4,4- isomers, boiling point at 760 mm Hg-232° C. |
| 20.25% | 1,4-cyclohexane -bis-(methylamine), 75% (cis-isomer, 25%, Eastman Chemicals) |
| 29.57% | Nonyl phenol, Gardner color 1; distillation range (modified ASTM, 5–95%): 291–300° C. |
| 21.93% | "DER-332" (Trademark for diglycidyl ether of bisphenol A; EEW: 172–176; viscosity: 4,000–5,500 cps) |
| 5.65% | Triethanolamine, 99% (Union Carbide Corporation) |
| 100.00% ,1/32 | |

The manufacturing procedure for part A involves beginning with the bisphenol A-type diglycidyl ether and adding thereto the aliphatic glycidyl ether ("EPI-REZ" or "Epoxide 7") and the "Silane A187". In the case of the "fast cure" part A, the pigment can be added after the "EPI-REZ" and the silane can be added last.

Maintaining the mixing temperature within the range of 130°–170° F. helps to insure complete mixing. Dispersion-type mixing equipment (e.g. a "COWLES" mixer) can be used for dispersion of pigments, fillers, etc. In the "slow cure" composition, it is preferred to disperse the titanium dioxide in the "DER-331", followed by a second dispersion step for the "Cab-O-Sil" M-5, followed by the addition of the "Epoxide 7", dinonyl phenol, and the "Silane". For ease of mixing, the asbestos is added last.

In the case of the part B, all active hydrogen-containing components except for the triethanolamine are blended together first. Exothermic heating to 100°–120° F. occurs spontaneously. The mixture is then cooled to 80° F. prior to the addition of the "DER-332". Another exotherm results as the amine or amine-phenol/epoxide adduct is formed. The mixture is then cooled to 80° F. before addition of the triethanolamine.

A part A/part B mixture can be applied smoothly at a thickness of 15 mils, followed by an immediate overlay of glass beads.

What is claimed is:

1. A two-part coating system capable of forming a hard coating, said coating system consisting essentially of:
   (a) in a first part, a pigmented liquid curable vicinal epoxide composition comprising a polyglycidyl ether of a polyhydric phenol, said polyglycidyl ether having an average epoxide functionality greater than 1 but less than 3 and an epoxide equivalent weight greater than 150 but less than 1000; said first part further comprising a glycidyl or polyglycidyl ether of an aliphatic mono-ol or polyol as a viscosity reducing, reactive diluent for said first part;
   (b) in an active hydrogen-containing, epoxide-reactive second part, a blended co-reactant for said first part, said blended co-reactant consisting essentially of an amine-epoxy adduct and the following difunctional amines:
   $H_2N-R-NH_2$, and
   $H_2N-CH_2-A-CH_2-NH_2$,
   wherein R represents a branched alkylene moiety and A represents a divalent cycloaliphatic group; said difunctional amines being blended in a weight ratio ranging from 10:90 to about 90:10; said amine-epoxy adduct comprising 5–75% by weight of a reaction product of the components comprising a said difunctional amine, a diglycidyl ether of a dihydric phenol, and an alkyl-substituted monohydric phenol;
   said two-part coating system being substantially free of non-reactive, essentially volatile organic liquid diluents and containing a silane adhesion promoter.

2. A sprayable two-part coating system according to claim 1 wherein said second part consists essentially of:
   (c) 5–50% by weight of a hexamethylene diamine, said hexamethylene chain having at least one methyl substituent thereon;
   (d) 5–50% by weight bis(aminomethyl) cyclohexane;
   (e) 0.5–10% by weight triethanolamine; and
   (f) substantially the balance of said second part being said reaction product.

3. A sprayable, blended, active-hydrogen-containing co-curative agent for a curable epoxide, said co-curative agent consisting essentially of:
   (a) 5–50% by weight tri-methyl-substituted hexamethylene diamine;
   (b) 5–50% by weight bis(aminomethyl) cyclohexane;
   (c) 5–50% by weight nonyl phenol;
   (d) 5–30% by weight of a diglycidyl ether of a dihydric phenol; and
   (e) 0.5–10% by weight of triethanolamine;
   a portion of the active hydrogen-bearing components of said cocurative agent having been reacted with said component (d) to produce an epoxide-amine adduct without consuming all of the available active hydrogen in said co-curative agent; said co-curative agent being substantially free of non-reactive, essentially volatile organic liquid diluents.

4. A co-curative agent according to claim 3, said agent consisting essentially of:
   (a) 22–23% 2,2,4-trimethyl hexamethylene diamine;
   (b) 20–21% 1,4-cyclohexane-bis(methylamine);
   (c) 29–30% nonyl phenol;
   (d) about 22% of the diglycidyl ether of bisphenol A having an epoxide equivalent weight within the range of 180–200; and
   (e) 5–6% by weight of triethanolamine.

5. A chemically cured layer comprising the coating system of claim 1, the two parts of which have been mixed together and co-reacted.

UNITED STATES PATENT AND TRADEMARK OFFICE
CERTIFICATE OF CORRECTION

PATENT NO. : 4,088,633
DATED : May 9, 1978
INVENTOR(S) : Richard S. Gurney

It is certified that error appears in the above-identified patent and that said Letters Patent are hereby corrected as shown below:

```
Column 1, line 12, for "types" read --type--.
Column 2, line 56, for "Lobana" read --Labana--.
Column 6, line 10, for "a" read --A--.
Column 6, lines 13 and 14, for "bishpenol" read --bisphenol--.
Column 8, line 2, for "methylolsubstituted" read
      --methylol-substituted--.

Column 10, line 30, for "0.5-wt-%" read --0.5-10 wt-%--.

Column 14, line 30, for "Epoxide 7" read --Epoxide #7--.
Column 14, line 49, for "HG-" read --Hg:--.
Column 14, line 61, delete ",1/32".
Column 14, line 66, for "7" read --#7--.
Column 15, line 8, for "7" read --#7--.
Column 16, line 29, for "cocurative" read --co-curative--.
```

Signed and Sealed this

Thirty-first Day of October 1978

[SEAL]

Attest:

RUTH C. MASON
Attesting Officer

DONALD W. BANNER
Commissioner of Patents and Trademarks